United States Patent
Wang et al.

(10) Patent No.: US 9,098,123 B2
(45) Date of Patent: *Aug. 4, 2015

(54) MOVING TRAJECTORY GENERATION METHOD

(75) Inventors: Jeen-Shing Wang, Tainan (TW); Yu-Liang Hsu, Kaohsiung (TW)

(73) Assignee: National Cheng Kung University, Tainan (TW)

(*) Notice: Subject to any disclaimer, the term of this patent is extended or adjusted under 35 U.S.C. 154(b) by 414 days.

This patent is subject to a terminal disclaimer.

(21) Appl. No.: 13/566,620

(22) Filed: Aug. 3, 2012

(65) Prior Publication Data
US 2013/0069917 A1    Mar. 21, 2013

Related U.S. Application Data

(60) Provisional application No. 61/514,960, filed on Aug. 4, 2011.

(51) Int. Cl.
*G06F 3/0346* (2013.01)
*G06F 3/03* (2006.01)
*G06K 9/22* (2006.01)
*G06F 3/0354* (2013.01)

(52) U.S. Cl.
CPC ............... *G06F 3/03* (2013.01); *G06F 3/0346* (2013.01); *G06F 3/0354* (2013.01); *G06K 9/222* (2013.01)

(58) Field of Classification Search
None
See application file for complete search history.

(56) References Cited

U.S. PATENT DOCUMENTS

| | | | |
|---|---|---|---|
| 6,212,296 B1* | 4/2001 | Stork et al. | 382/188 |
| 8,150,162 B2* | 4/2012 | Du et al. | 382/187 |
| 2004/0148577 A1* | 7/2004 | Xu et al. | 715/530 |
| 2004/0236500 A1* | 11/2004 | Choi et al. | 701/200 |
| 2005/0069203 A1* | 3/2005 | Khomo | 382/186 |
| 2006/0182316 A1* | 8/2006 | Bang et al. | 382/122 |
| 2007/0091292 A1* | 4/2007 | Cho et al. | 355/75 |
| 2007/0133881 A1* | 6/2007 | Sim et al. | 382/202 |
| 2007/0171202 A1* | 7/2007 | Yang et al. | 345/158 |
| 2008/0255795 A1* | 10/2008 | Shkolnikov | 702/141 |

(Continued)

FOREIGN PATENT DOCUMENTS

TW    201101234 A1    1/2011

OTHER PUBLICATIONS

Sandip Agrawal et al., "PhonePoint Pen: Using Mobile Phones to Write in Air", Proceedings of the 1st ACM workshop on Networking, systems, and applications for mobile handhelds, pp. 1-6, Aug. 17, 2009.

*Primary Examiner* — Antonio Xavier
(74) *Attorney, Agent, or Firm* — Muncy, Geissler, Olds & Lowe, P.C.

(57) ABSTRACT

A moving trajectory generation method includes the following steps of: sensing a movement of a writing device in the air by a moving trajectory sensing module so as to generate a moving trajectory and then generate a moving trajectory signal; generating a virtual projection plane and a trajectory projection plane by a trajectory reconstruction unit of a trajectory reconstruction module according to the moving trajectory signal; calculating an angle between the virtual projection plane and the trajectory projection plane, and generating a transformation matrix according to the angle; transforming the virtual projection plane to the trajectory projection plane according to the transformation matrix; and projecting the moving trajectory to the trajectory projection plane so as to obtain a two-dimensional trajectory signal.

12 Claims, 12 Drawing Sheets

(56) References Cited

U.S. PATENT DOCUMENTS

| | | | |
|---|---|---|---|
| 2008/0260250 A1* | 10/2008 | Vardi | 382/186 |
| 2008/0291163 A1* | 11/2008 | Liberty | 345/156 |
| 2010/0033352 A1* | 2/2010 | Chuang et al. | 341/20 |
| 2010/0033422 A1* | 2/2010 | Mucignat et al. | 345/156 |
| 2010/0214423 A1* | 8/2010 | Ogawa | 348/208.4 |
| 2011/0048103 A1* | 3/2011 | Su et al. | 73/1.79 |
| 2011/0264400 A1* | 10/2011 | Youssef et al. | 702/141 |
| 2012/0020566 A1* | 1/2012 | Yamanouchi | 382/187 |

* cited by examiner

MOVING TRAJECTORY GENERATION METHOD

CROSS REFERENCE TO RELATED APPLICATIONS

The non-provisional patent application claims priority to U.S. provisional patent application with Ser. No. 61/514,960 filed on Aug. 4, 2011. This and all other extrinsic materials discussed herein are incorporated by reference in their entirety.

BACKGROUND OF THE INVENTION

1. Field of Invention

The present invention relates to a moving trajectory generation method.

2. Related Art

Recently, due to the rapid development of miniaturization technology, electronic circuits and components have become smaller and lighter while their function, portability and convenience are enhanced. This technology makes the human-computer interaction (HCI) has become one of the indispensable tools in our daily life. In particularly, the hand writing through the HCI is an essential recording or expressing method. Today, many handwriting-based HCI sensing technologies, which mainly include the electromagnetic, electric, supersonic, pressure, and optical sensing technologies, have been disclosed.

However, the electromagnetic HCI sensing technology needs a battery with larger capacity to provide a large power for generating the electromagnetic field so as to detect and position the writing position, which is the pen-point of the writing device. Thus, this type writing device becomes heavier and is inconvenient in carrying. Besides, the electric HCI sensing technology needs to cooperate with a specific electrode paper and use the transmission and receiving electrodes of the electrode paper to detect the moving trajectory of the writing device. Unfortunately, the electrode paper is very expensive, so this electric HCI sensing technology can not be popularized. The ultrasonic HCI sensing technology utilizes the arrival-time difference between the ultrasonic signals and the triangulation location method to calculate the writing trajectory coordinates of the pen-point of the writing device. Although the ultrasonic HCI sensing technology can precisely capture the moving trajectory of the writing device on any 2-dimensional plane, the writing range for receiving the ultrasonic waves with the cooperated receiving device is limited and very inconvenient. The pressure HCI sensing technology has a limited writing range within the area of the pressure sensing electronic board, so its operation is also inconvenient. The optical HCI sensing technology utilizes the optical sensor of the optical mouse to sense the moving trajectory of the writing device on a written plane. The sensing theory is similar to that of the optical mouse, so that it is possible to simply convert the moving trajectory information into the operation signal of the cursor without developing additional application programming interface (API) software.

However, in all of the above sensing technologies, when the writing motion is to write in the air (3-dimensional space) instead of on a 2-dimensional plane, the moving trajectory information can not be easily transformed into the 2-dimensional trajectory signal because the 3-dimensional space does not contain an actual writing plane.

Therefore, it is an important subject of the present invention to provide a moving trajectory generation method that can detect the 3-dimensional moving signal of the writing device and transform it into the correct moving trajectory on a 2-dimensional plane.

SUMMARY OF THE INVENTION

In view of the foregoing subject, an objective of the present invention is to provide a moving trajectory generation method that can detect the 3-dimensional moving signal of the writing device and transform it into the correct moving trajectory on a 2-dimensional plane.

To achieve the above objective, the present invention discloses a moving trajectory generation method comprising the steps of: sensing a movement of a writing device in the air by a moving trajectory sensing module so as to generate a moving trajectory and then generate a moving trajectory signal; generating a virtual projection plane and a trajectory projection plane by a trajectory reconstruction unit of a trajectory reconstruction module according to the moving trajectory signal; calculating an angle between the virtual projection plane and the trajectory projection plane, and generating a transformation matrix according to the angle; transforming the virtual projection plane to the trajectory projection plane according to the transformation matrix; and projecting the moving trajectory signal to the trajectory projection plane so as to obtain a two-dimensional trajectory signal.

In one embodiment, the moving trajectory signal comprises an angular velocity signal, an acceleration signal, a magnetic-field intensity signal, a geomagnetic orientation signal, or their combinations in three axes with respect to the moving trajectory at different time points.

In one embodiment, the moving trajectory generation method further comprises a step of: transforming the acceleration signal according to the angular velocity signal by an orientation calculation module so as to transform the acceleration signal from a body frame of the writing device to a local level frame.

In one embodiment, the acceleration signal comprises a first axial signal, a second axial signal and a third axial signal, and a first axis, a second axis, and a third axis are perpendicular to each other.

In one embodiment, in the step of generating the virtual projection plane and the trajectory projection plane, the third axis is a normal vector axis, and the first axis and the second axis are two basis vector axes.

In one embodiment, the normal vector axis refers to the weakest signal magnitude of the first axial signal, the second axial signal and the third axial signal.

In one embodiment, the basis vector axes define the virtual projection plane.

In one embodiment, the angle is obtained according to the second axial signal and the third axial signal.

In one embodiment, the moving trajectory represents a trajectory of the writing device projected on the trajectory projection plane as the writing device moves in the air.

In one embodiment, before projecting the moving trajectory signal on the trajectory projection plane, the moving trajectory generation method further comprises a step of calibrating the first axial signal and the second axial signal according to the third axial signal by a detecting-calibration unit of the trajectory reconstruction module, so as to generate a first axial trajectory signal and a second axial trajectory signal.

In one embodiment, the step of calibrating the first axial signal comprises: when a variation of the third axial signal within a time interval exceeds a preset signal value, the detecting-calibration unit zeros the first axial signal within the time interval.

In one embodiment, the step of calibrating the second axial signal comprises: when a variation of the third axial signal within a time interval exceeds a preset signal value, the detecting-calibration unit zeros the second axial signal within the time interval.

In one embodiment, the moving trajectory generation method further comprises a step of: performing a calculation to the two-dimensional trajectory signal by a trajectory calculation unit of the trajectory reconstruction module.

In one embodiment, the moving trajectory generation method further comprises a step of displaying the two-dimensional moving trajectory by a display module according to the calculated two-dimensional trajectory signal.

As mentioned above, the moving trajectory generation method of the invention is to sense a movement of a writing device in the air (3-dimensional space) by a moving trajectory sensing module so as to generate a moving trajectory and then generate a moving trajectory signal, to generate a virtual projection plane and a trajectory projection plane by a trajectory reconstruction unit of a trajectory reconstruction module according to the moving trajectory signal, to calculate an angle between the virtual projection plane and the trajectory projection plane and generate a transformation matrix according to the angle, to transform the virtual projection plane to the trajectory projection plane according to the transformation matrix, and to project the moving trajectory to the trajectory projection plane so as to obtain a two-dimensional trajectory signal. Accordingly, the moving trajectory generation method of the invention can detect the 3-dimensional moving signal of the writing device, which moves in the air (3-dimensional space), and transform it into the correct moving trajectory on a 2-dimensional plane.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
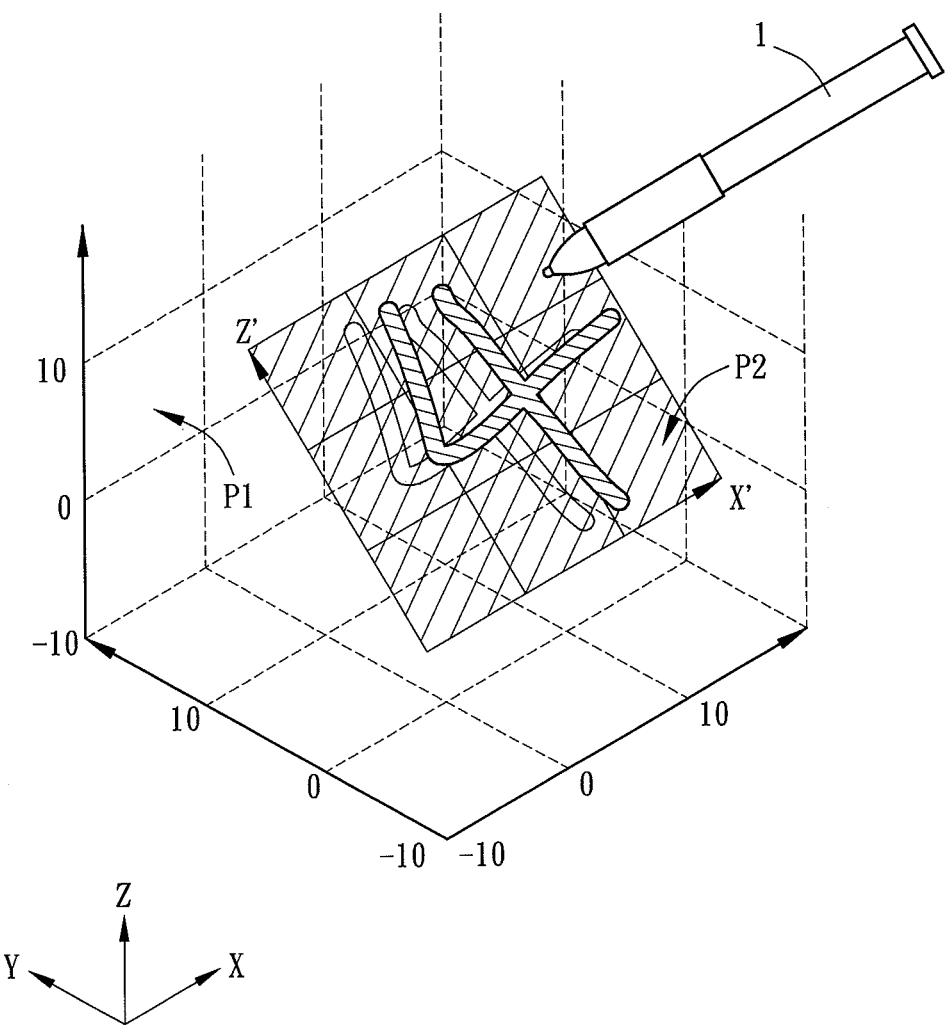
FIG. 1A is a schematic diagram showing the circumstance of using a writing device to write in the air (3-dimensional space)
Figure 1B:
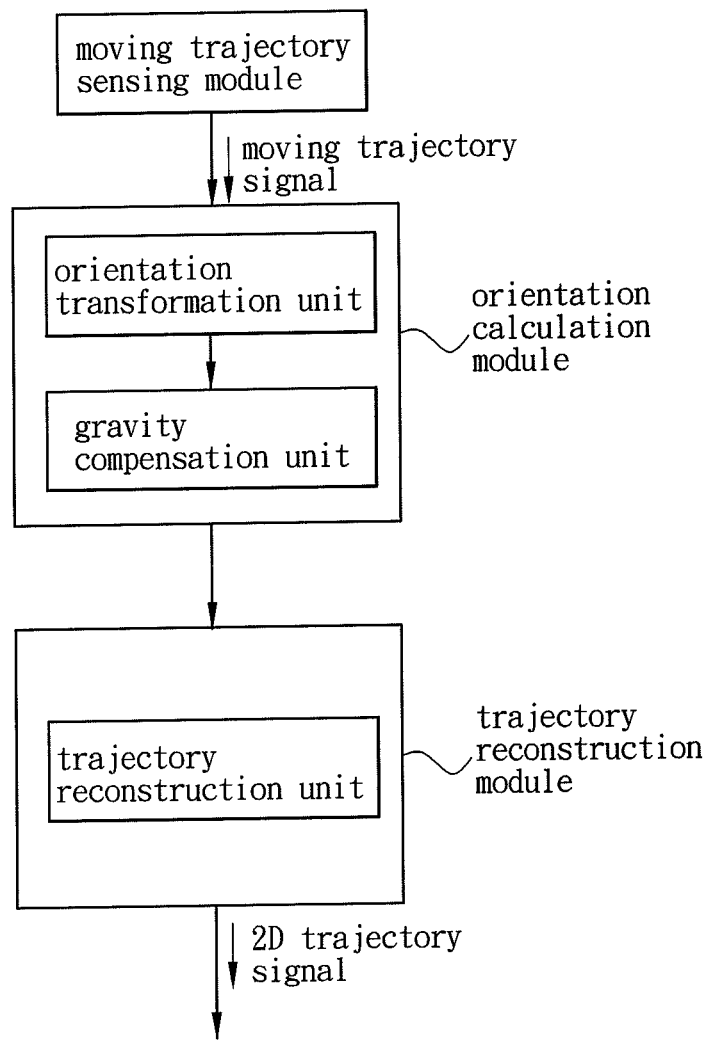
FIG. 1B is a block diagram of the writing device of FIG. 1A.

FIG. 1A is a schematic diagram showing the circumstance of using a writing device 1 to write in the air (3-dimensional space), and FIG. 1B is a block diagram of the writing device 1.

The writing device 1 includes an inertia sensing element for sensing the angle, orientation, and displacement of the writing device 1 in the 3-dimensional space. In this case, the shape of the writing device 1 is a pen. Otherwise, the writing device can be made of other shapes or types such as a mouse.

Referring to FIG. 1B, the writing device 1 includes a moving trajectory sensing module. In addition, the writing device 1 may further include an orientation calculation module. In other embodiments, another processing device, such as a computer, may also include the orientation calculation module, and the signals generated by the moving trajectory sensing module can be transmitted to the orientation calculation module by wires or wireless for further calculation.

The moving trajectory sensing module can sense a moving trajectory, which is generated as the writing device 1 moves in the 3-dimensional space, and generate a moving trajectory signal in real time. The moving trajectory sensing module includes a multi-axis dynamic switch. The moving trajectory can be a trajectory of a digit, a letter, a symbol, a line or any writing trajectory. In addition, the moving trajectory signal may include the coordinate information, angular velocity information, gravity information, acceleration information, magnetic-field intensity information, geomagnetic orientation information, any other information, or their combinations in three axes with respect to a moving trajectory at different time points.

The moving trajectory sensing module includes, for example, a gyroscope, an accelerometer, a magnetometer or an electronic compass, or their combinations. These devices can be a single axis or multiple axes (e.g. three axes), and the moving trajectory signal includes an angular velocity signal, an acceleration signal, a magnetic-field intensity signal, a geomagnetic orientation signal, or their combinations in three axes with respect to a moving trajectory at different time points. In this embodiment, the moving trajectory sensing module includes a triaxial gyroscope, a triaxial accelerometer, and a triaxial magnetometer, which can generate the sensing signals in real time, for measuring the angular velocity signals, the gravity g, and the acceleration signals in three axes. Herein, the magnetometer can compensate the outputted angle in the rotation direction within the yaw angle of the gyroscope. To be noted, the writing device 1 or another processing device may further include a calibration filtering unit (not shown), which can calibrate the signal generated by the inertia element of the moving trajectory sensing module, such as the above-mentioned gyroscope, accelerometer, magnetometer or electronic compass, or their combinations, and filter the noise of the inertia element or the distorted moving trajectory signal caused by unintentional hand motion (e.g. hand trembles) or other environmental interference.

Before performing the steps of the moving trajectory calibration method of the embodiment, the moving trajectory signal (e.g. angular velocity signals and the acceleration signals) must be preprocessed. As shown in FIG. 1B, the triaxial angular velocity signals are integrated by an orientation transformation unit of the orientation calculation module so as to obtain an orientation angle of the writing device 1. Herein, the orientation angle includes the roll angle Φ, the pitch angle θ, and the yaw angle φ. The major function of the orientation angle is to provide the relative angle or rotation relationship between the body frame and local level frame of the writing device 1.

The roll angle Φ represents an angle that the writing device 1 rotates along a first axis of the body frame, which can be obtained by integrating the angular velocity of the writing device 1 in the first direction. In other aspects, the roll angle Φ also represents an angle that the writing device 1 rotates along the first direction, which can be obtained according to the components of gravity measured by the accelerometer of the writing device 1 in triaxial directions. In addition, the pitch angle θ represents an angle that the writing device 1 rotates along a second axis of the body frame, which can be obtained by integrating the angular velocity of the writing device 1 in the second direction. In other aspects, the pitch angle θ also represents an angle that the writing device 1 rotates along the second direction, which can be obtained according to the components of gravity measured by the accelerometer of the writing device 1 in triaxial directions. The yaw angle φ represents an angle that the writing device 1 rotates along the third direction, which can be obtained by integrating the angular rate of the writing device 1 in the third direction. In other aspects, the yaw angle φ also represents an angle that the writing device 1 rotates along a third direction, which can be obtained according to the magnetic-field intensity measured by the magnetometer of the writing device 1, or by the geomagnetic orientation measured by the electronic compass. Otherwise, the roll angle, pitch angle, and yaw angle can also be obtained according to, for example but not limited to, the magnetic-field intensity, geomagnetic orientation, or their combinations of the writing device 1.

Afterwards, the orientation transformation unit generates a coordinate transformation matrix according to the angular velocity signal and its orientation angle, so that the acceleration signals in three axes generated by the moving trajectory sensing module can be transformed from the body frame of the writing device 1 to the local level frame by the coordinate transformation matrix. In addition, a gravity compensation unit of the orientation calculation module performs a gravity compensation to the acceleration signal so as to eliminate the acceleration variation caused by gravity. Then, the moving trajectory can be generated according to the moving trajectory generation method of the present invention. To be noted, the above-mentioned coordinate transformation and gravity compensation are well known by those who skilled in the art, so their detailed descriptions will be omitted.

Figure 1C:
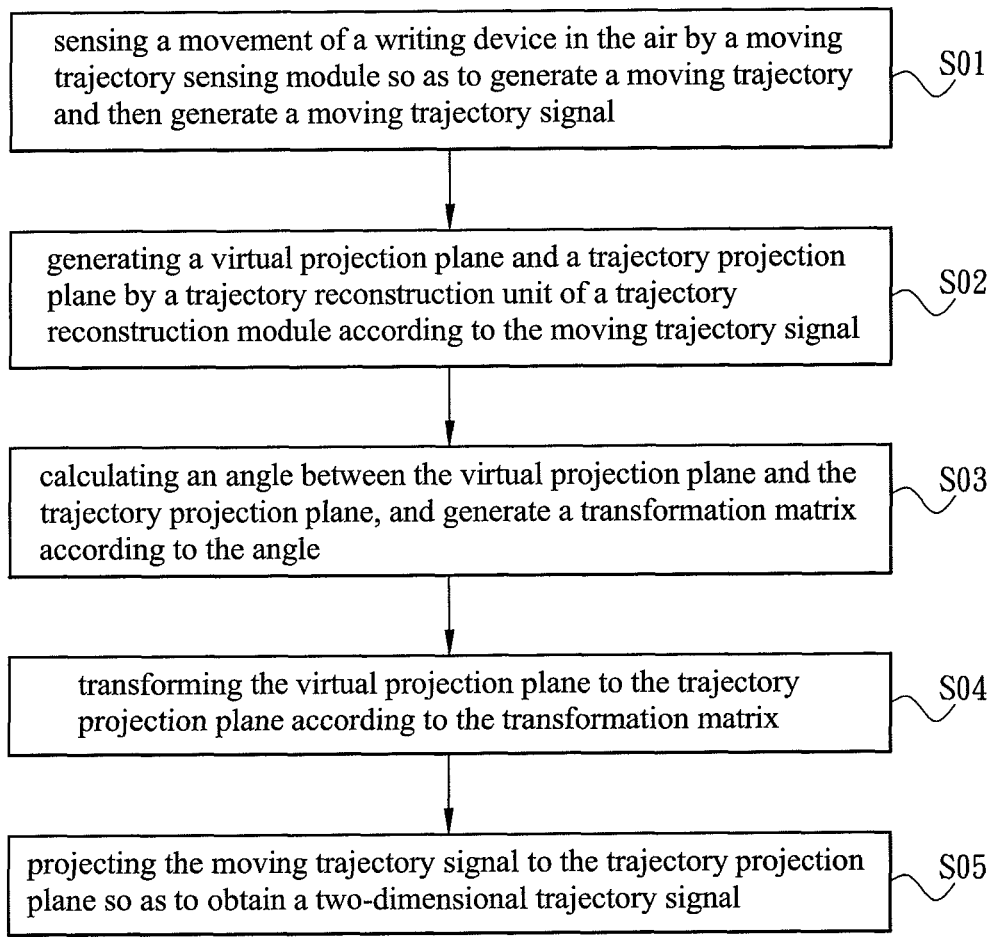
FIG. 1C is a flow chart of a moving trajectory generation method according to a preferred embodiment of the invention.

FIG. 1C is a flow chart of a moving trajectory generation method according to a preferred embodiment of the invention.

Referring to FIGS. 1A to 1C, the moving trajectory generation method of the invention includes the steps S01 to S05.

First, the step S01 is to sense a movement of a writing device 1 in the air (3-dimensional space) by a moving trajectory sensing module so as to generate a moving trajectory and then generate a moving trajectory signal. With reference to FIG. 1A, for example, the user operates the writing device 1 to write a number "4". The technical features and operations of the moving trajectory sensing module and the moving trajectory signal have been describe hereinabove, so the detailed descriptions thereof will be omitted. In this embodiment, the step S01 can generate the acceleration signals in three axes (X, Y and Z axes) of the local level frame with gravity compensation, such as a first axial signal, a second axial signal and a third axial signal. Herein, the first axis, the second axis and the third axis are perpendicular to each other.

Next, the step S02 is to generate a virtual projection plane P1 and a trajectory projection plane P2 by a trajectory reconstruction unit of a trajectory reconstruction module according to the moving trajectory signal. In this embodiment, in the step S02 of generating the virtual projection plane P1 and the trajectory projection plane P2, the Y axis is a normal vector axis, the X axis and the Z axis are two basis vector axes. Herein, the normal vector axis refers to the weakest signal magnitude of the first axial signal, the second axial signal and the third axial signal. In other words, the moving trajectory represents a trajectory of the writing device 1 projected on the trajectory projection plane P2 as the writing device 1 moves in the air, and the trajectory projection plane P2 is the assumed written plane. In order to generate the virtual projection plane P1, it is necessary to compare the first, second and third axial signals so as to find out the weakest one (weakest average signal magnitude), and then use the axis of the weakest axial signal as the normal vector axis to build the virtual projection plane P1. Herein, the normal vector axis is perpendicular to the virtual projection plane P1.

In this embodiment, as shown in FIG. 1A, the normal vector axis is the Y axis (defined as the third axis Y), and the basis vector axes are the X axis (defined as the first axis X) and the Z axis (defined as the second axis Z). The basis vector axes (the first axis X and the second axis Z) can define the virtual projection plane P1. Of course, in other embodiments, the normal vector axis can be the Z axis or the X axis, and this is determined based on the acceleration signals in three axes.

Figure 2A:
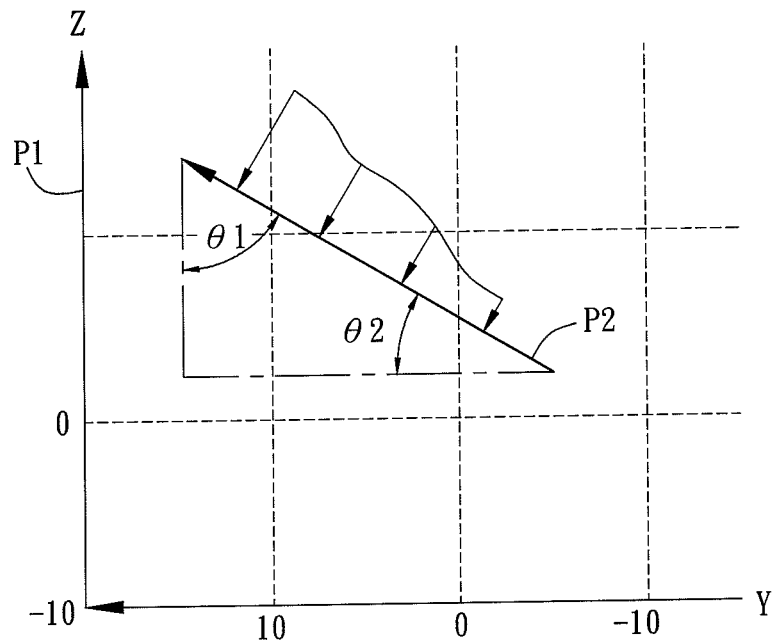
FIGS. 2A and 2B are schematic diagrams showing the relationship between the virtual projection plane and trajectory projection plane of FIG. 1A.
Figure 2B:
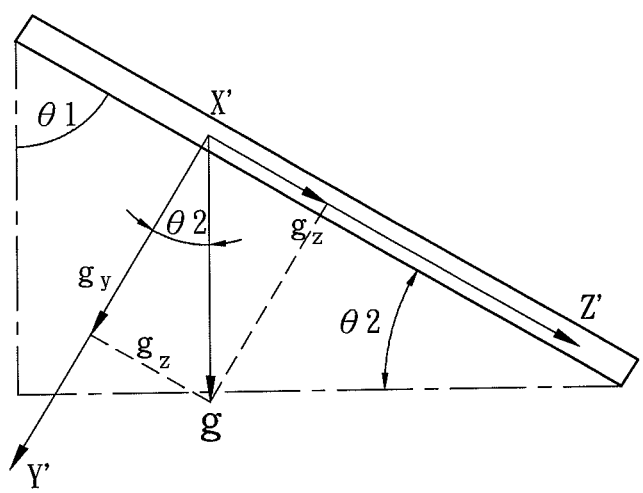

Then, the step S03 is to calculate an angle θ1 between the virtual projection plane P1 and the trajectory projection plane P2, and generate a transformation matrix according to the angle θ1. The relationship between the virtual projection plane P1 and trajectory projection plane P2 of FIG. 1A are shown in FIGS. 2A and 2B.

In this embodiment, since the normal vector axis is the third axis Y and the second axis Z is parallel to the virtual projection plane P1, the trajectory reconstruction unit can calculate the angle θ2

$$\left(\theta 2 = \tan^{-1}\frac{g_z}{g_y}\right)$$

according to me second axial signal (acceleration signal $g_z$) and the third axial signal (acceleration signal $g_y$). Accordingly, the angle θ1 (θ1=90°−θ2) between the virtual projection plane P1 and the trajectory projection plane P2 can be obtained. After that, a transformation matrix T can be generated according to the angle θ1. Herein, the transformation matrix T is $$\begin{bmatrix} 1 & 0 & 0 \\ 0 & \cos(\theta 1) & \sin(\theta 1) \\ 0 & -\sin(\theta 1) & \cos(\theta 1) \end{bmatrix}.$$

Afterwards, the step S04 is to transform the virtual projection plane P1 to the trajectory projection plane P2 according to the transformation matrix T. In this case, the trajectory reconstruction unit can rotate the virtual projection plane P1 by an angle θ1 according to the transformation matrix T so as to overlap the virtual projection plane P1 with the trajectory projection plane P2. That is, the virtual projection plane P1 and the trajectory projection plane P2 become the same plane. To be noted, when the moving trajectory as writing in the air is located in the X-Z plane of FIG. 1A, the trajectory projection plane is defined as the X-Z plane. In this case, the virtual projection plane and the trajectory projection plane are the same plane, and the included angle therebetween is 0 degree, so that the steps S03 and S04 can be omitted. Similarly, when the virtual projection plane and the trajectory projection plane are all referred to the X-Y plane, the steps S03 and S04 can also be omitted. Of course, when moving trajectory is located in the Y-Z plane of FIG. 1A, the steps S03 and S04 are unnecessary too.

Finally, the step S05 is to project the moving trajectory signal to the trajectory projection plane P2 so as to obtain a two-dimensional trajectory signal. In this case, the virtual projection plane P1 and the trajectory projection plane P2 are the same plane, so that the moving trajectory signal can be directly projected to the trajectory projection plane P2 so as to obtain a two-dimensional trajectory signal of the writing device 1 on the trajectory projection plane P2.

In this embodiment, in order to obtain a more correct moving trajectory, it is suggested to perform another calibration step before the step S05 of projecting the moving trajectory signal to the trajectory projection plane P2.

Figure 3A:
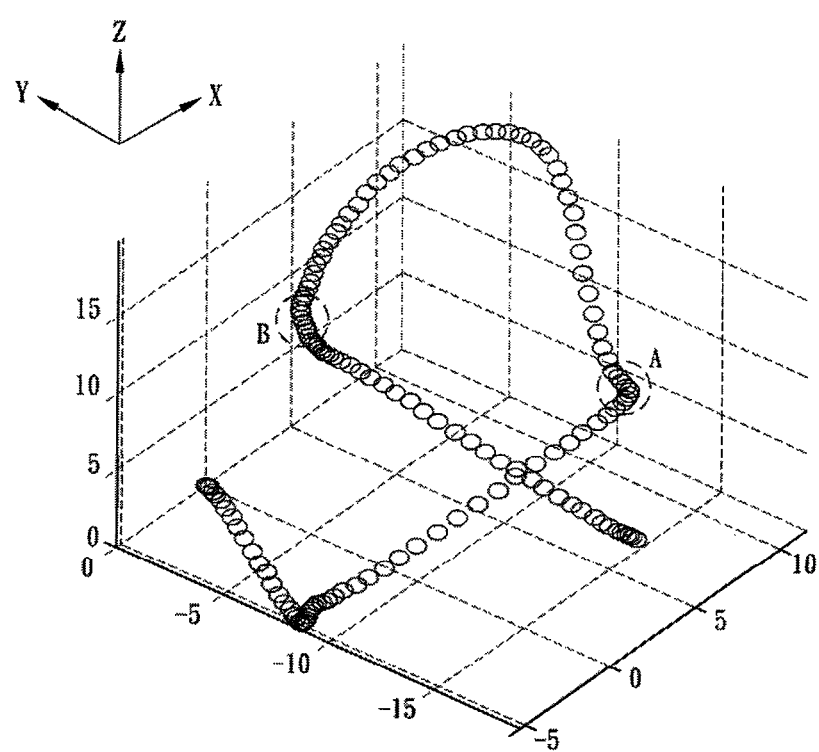
FIG. 3A is a schematic diagram showing the moving trajectory as using the writing device to write "4"

FIG. 3A is a schematic diagram showing the moving trajectory as using the writing device 1 to write "4". With reference to FIG. 3A, a part of the moving trajectory from the position A to the position B is generated as the writing device 1 is lifted up and moved. Accordingly, the moving trajectory must be calibrated to eliminate the part of the moving trajectory generated as the writing device 1 is lifted up and moved (from the position A to the position B), thereby obtaining the correct moving trajectory of the number "4". Then, the correct moving trajectory is projected to the trajectory projection plane P2.

Figure 4A:
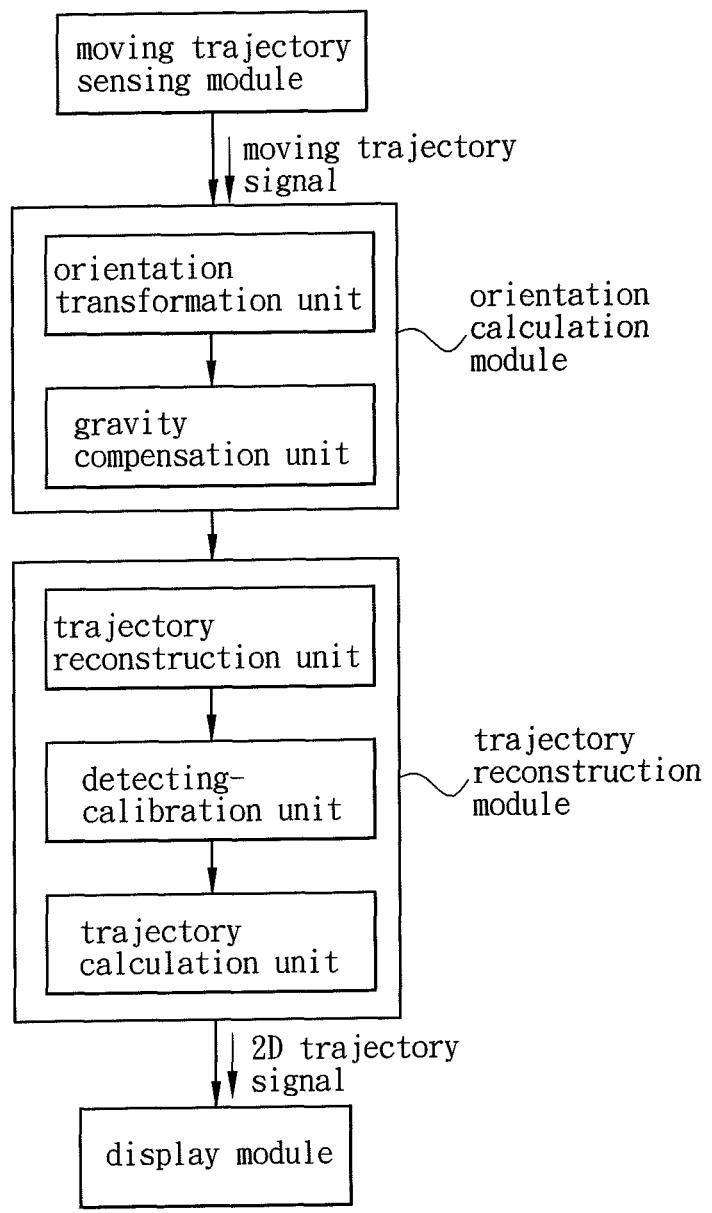
FIG. 4A is a block diagram of the writing device which writes in the air.

Referring to FIG. 4A, before projecting the moving trajectory signal to the trajectory projection plane P2, the moving trajectory generation method of the invention may further include a step of: calibrating the first axial signal and the second axial signal according to the third axial signal by a detecting-calibration unit of the trajectory reconstruction module, so as to generate a first axial trajectory signal and a second axial trajectory signal. In this embodiment, the first axis is the X axis, the second axis is the Z axis, and the third axis is the Y axis (normal vector axis). Thus, the acceleration signal in the third axis Y is generated by the movement of lifting up and moving the writing device 1, which is the part to be eliminated, so that the acceleration signals in the X and Z axes should be calibrated according to the acceleration signal in the Y axis.

Figure 4B:
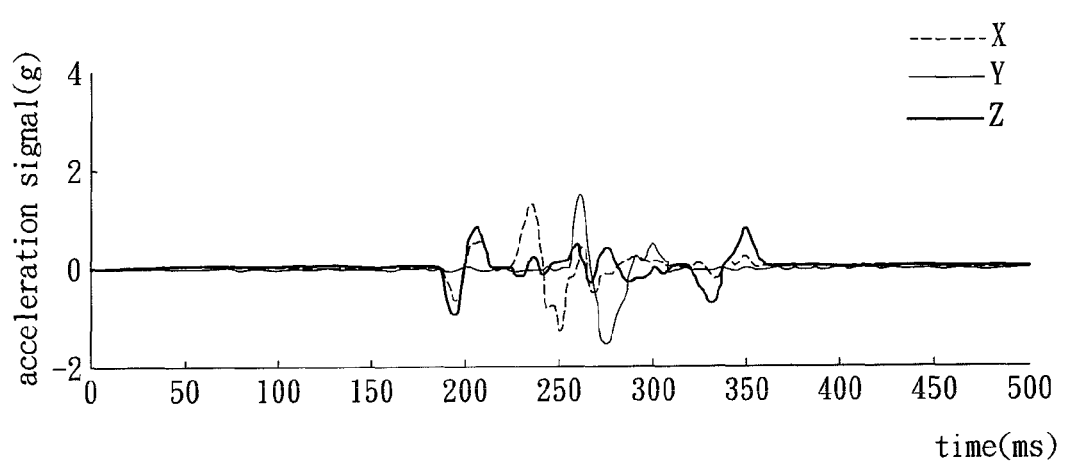
FIG. 4B is a waveform diagram showing the acceleration signals in three axes from the moving trajectory signal.
Figure 5A:
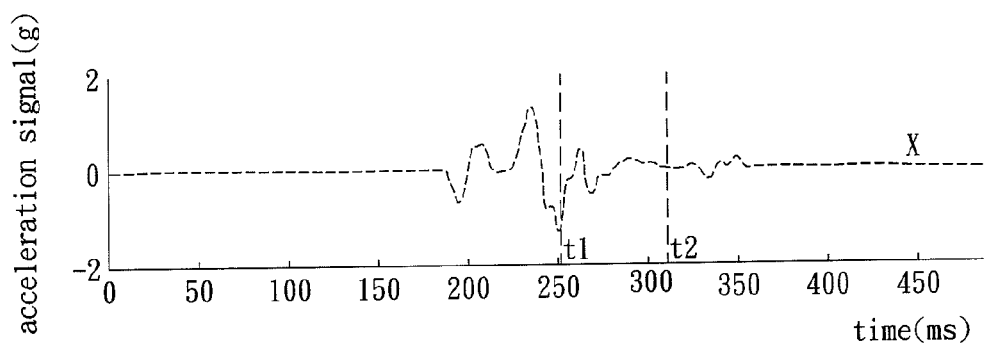
FIGS. 5A to 5C are waveform diagrams of a first axial signal, a second axial signal, and a third axial signal of the acceleration signals, respectively.
Figure 5B:
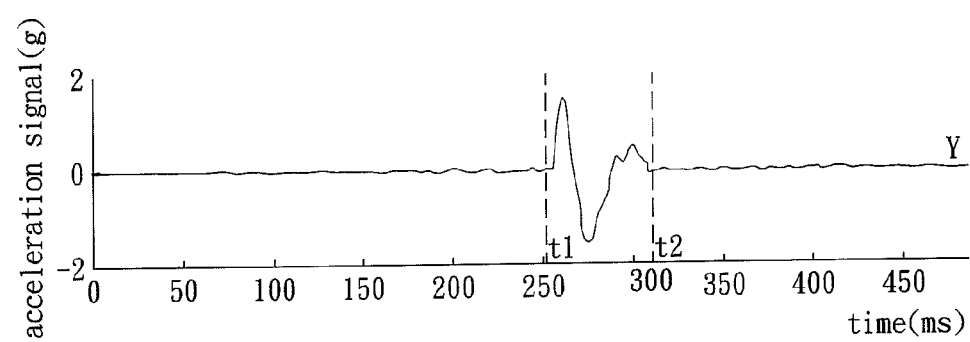
Figure 5C:
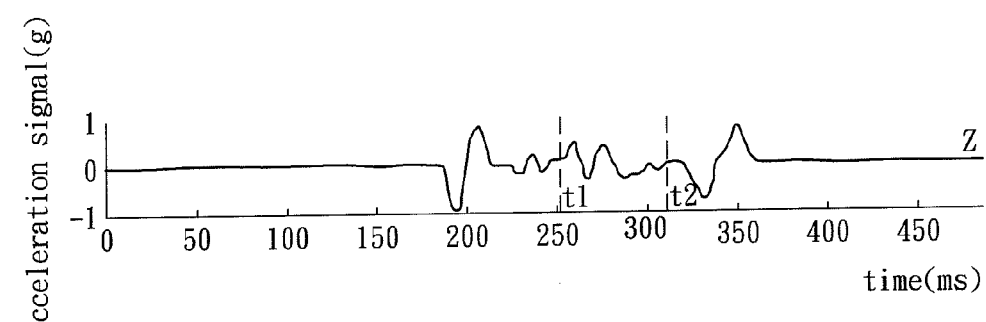

FIG. 4B is a waveform diagram showing the acceleration signals in three axes from the moving trajectory signal after the gravity compensation, and FIGS. 5A to 5C are waveform diagrams of a first axial signal, a second axial signal, and a third axial signal of the acceleration signals, respectively. The make the following illustration and drawings more comprehensive, FIGS. 5A to 5C respectively show the acceleration signals in three axes (local level frame).

In this embodiment, the step of calibrating the first axial signal includes the step of when a variation of the third axial signal within a time interval exceeds a preset signal value, the detecting-calibration unit zeros the first axial signal within the time interval. Herein, the preset signal value can be determined by the user. In other words, the third axial signal (Y axis) is unnecessary. Accordingly, when the variation of the third axial signal within a time interval (between t1 and t2 of FIG. 5B) exceeds the preset signal value, it is determined that the third axial signal is caused by the motion of lifting up the writing device and moving the writing device to next stroke. Thus, the signal in the first axis X within this time interval must be eliminated, which is to zero the first axial signal within this time interval. FIG. 5A shows the first axial signal within this time interval but does not show that the first axial signal is zeroed within this time interval.

Moreover, the detecting-calibration unit calibrates the second axial signal according to the third axial signal so as to generate a second axial trajectory signal. Similarly, when a variation of the third axial signal within a time interval exceeds a preset signal value, the detecting-calibration unit zeros the second axial signal within the time interval. Thus, the signal in the second axis Z within this time interval must be eliminated too, which is to zero the second axial signal within this time interval. FIG. 5C shows the second axial signal within this time interval but does not show that the second axial signal is zeroed within this time interval. In brief, before the step S05 of projecting the moving trajectory signal to the trajectory projection plane P2, the above calibration steps can be performed to eliminate the error caused by the motion of lifting up the writing device and moving the writing device to next stroke. Then, the two-dimensional trajectory signal obtained by the step S05 can represent the correct two-dimensional writing trajectory.

Figure 6:
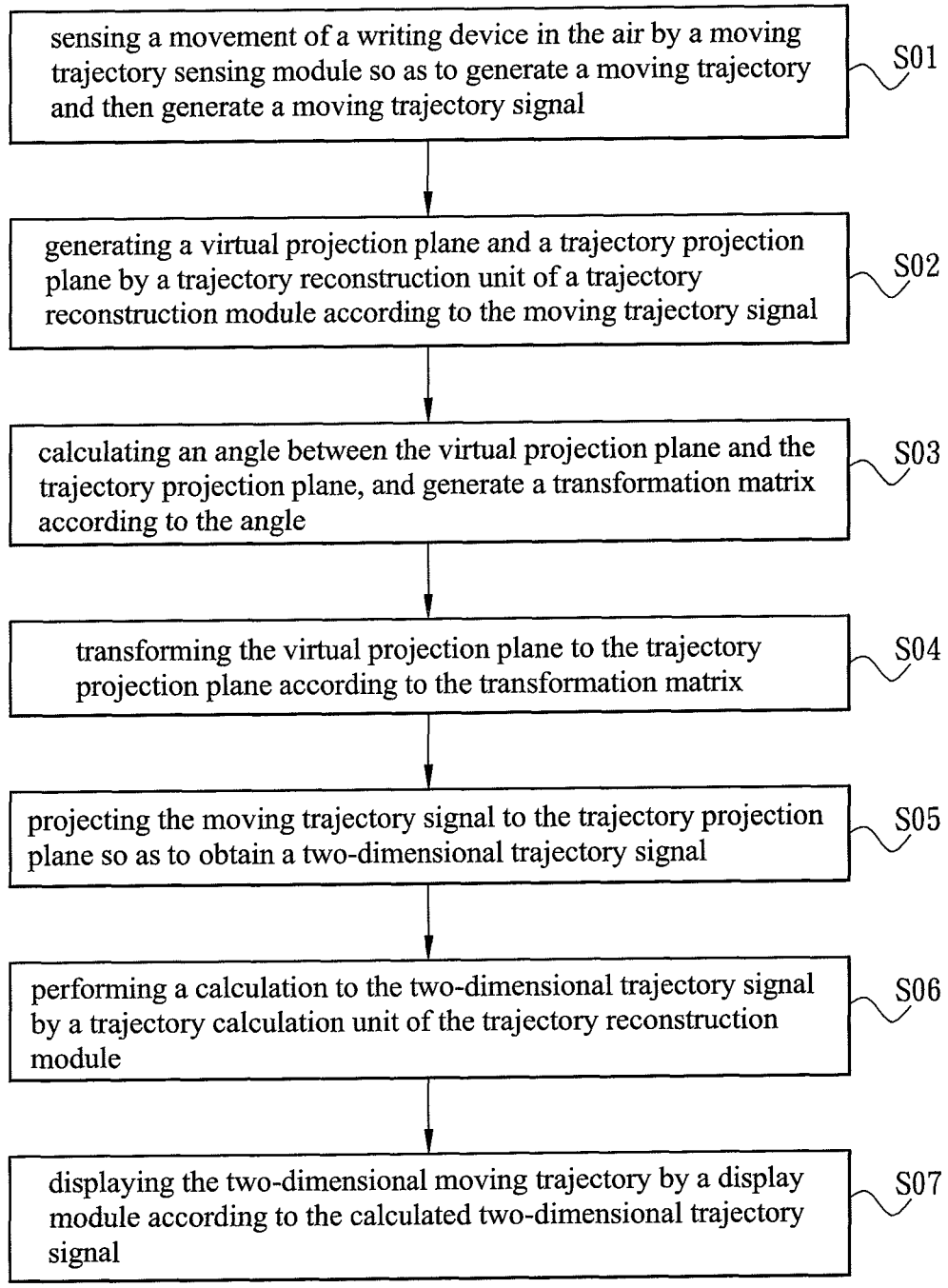
FIG. 6 is a flow chart of another moving trajectory generation method of the invention.

FIG. 6 is a flow chart of another moving trajectory generation method of the invention.

Referring to FIGS. 4A and 6, the moving trajectory generation method further includes steps S06 and S07.

The step S06 is to perform a calculation to the two-dimensional trajectory signal by a trajectory calculation unit of the trajectory reconstruction module. In this step S06, the two-dimensional trajectory signal is integrated twice to transform the acceleration signals in the first and second axes to a displacement signal.

Figure 3B:
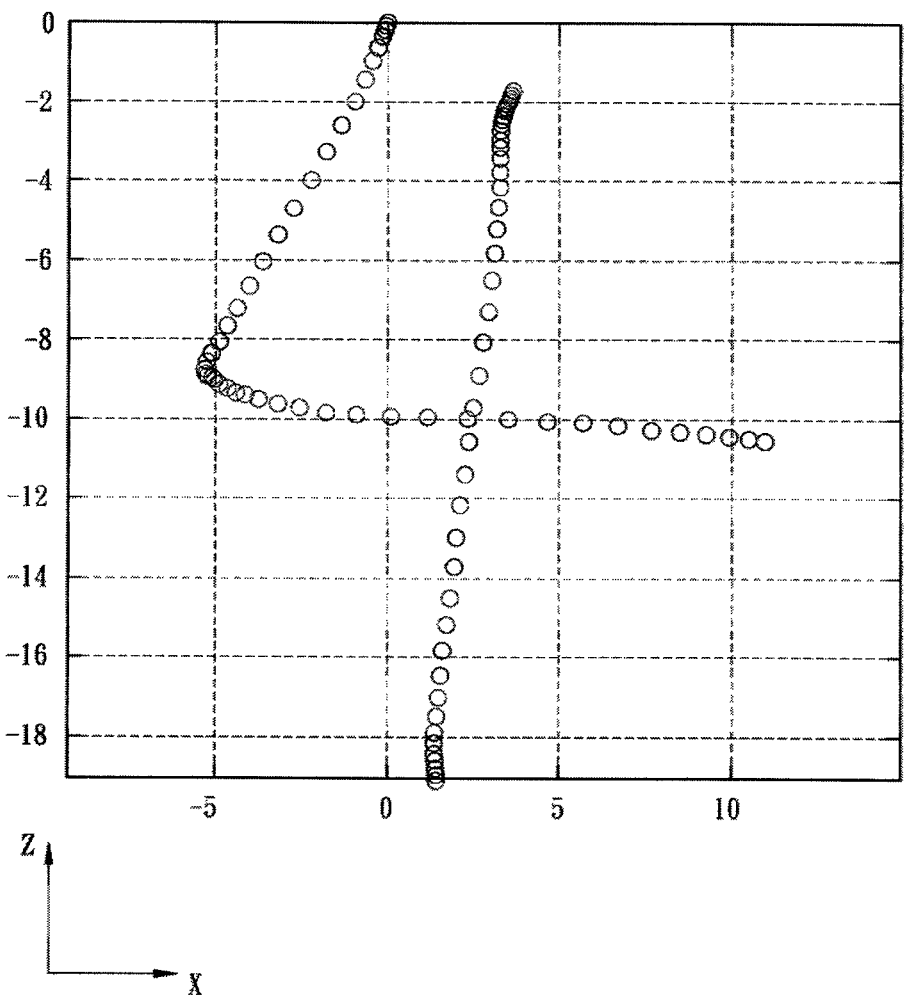
FIG. 3B is a schematic diagram showing a modified moving trajectory displayed by the display module with applying the moving trajectory generation method of the invention to the moving trajectory of FIG. 3A.

Finally, the step S07 is to display the two-dimensional moving trajectory by a display module according to the calculated two-dimensional trajectory signal. In this case, the display module can transform the displacement signal into a moving trajectory and display the correct trajectory of "4" as shown in FIG. 3B.

Figure 7:
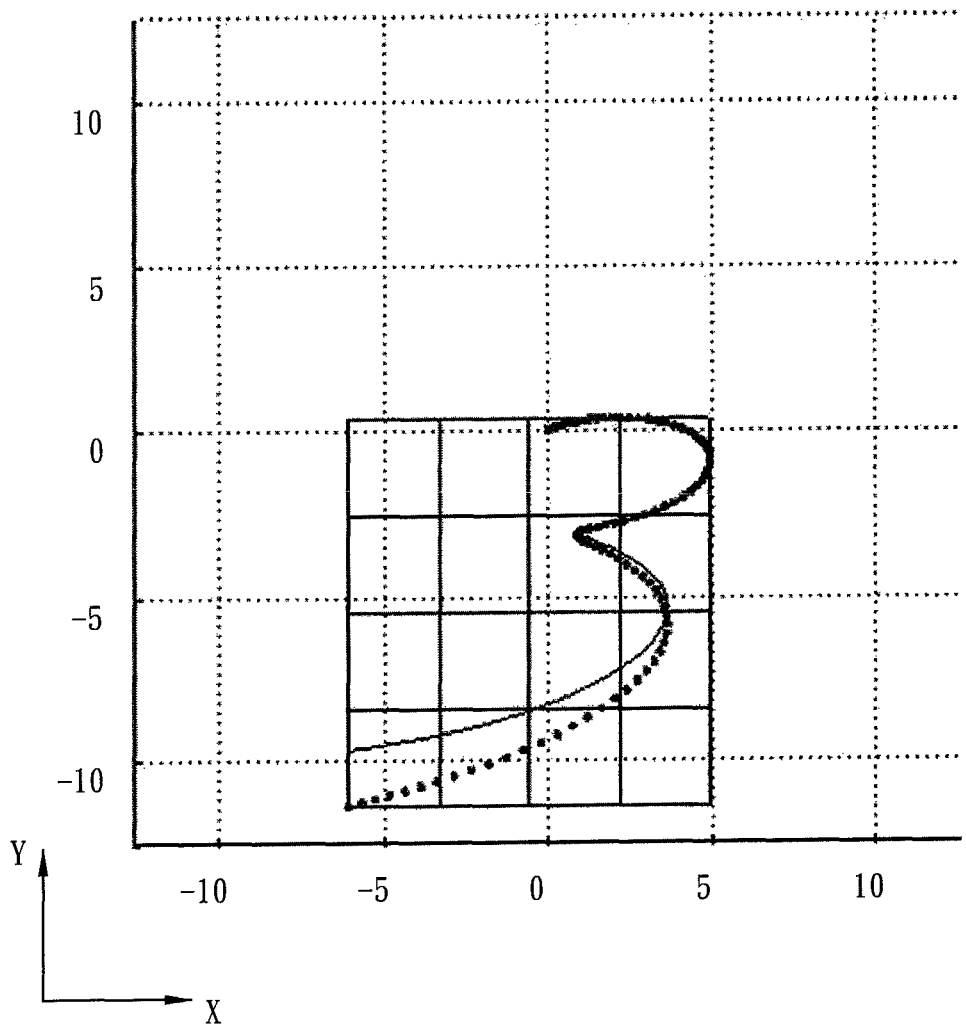
FIGS. 7 and 8 are schematic diagrams showing the moving trajectory obtained by the moving trajectory generation method of the invention.
Figure 8:
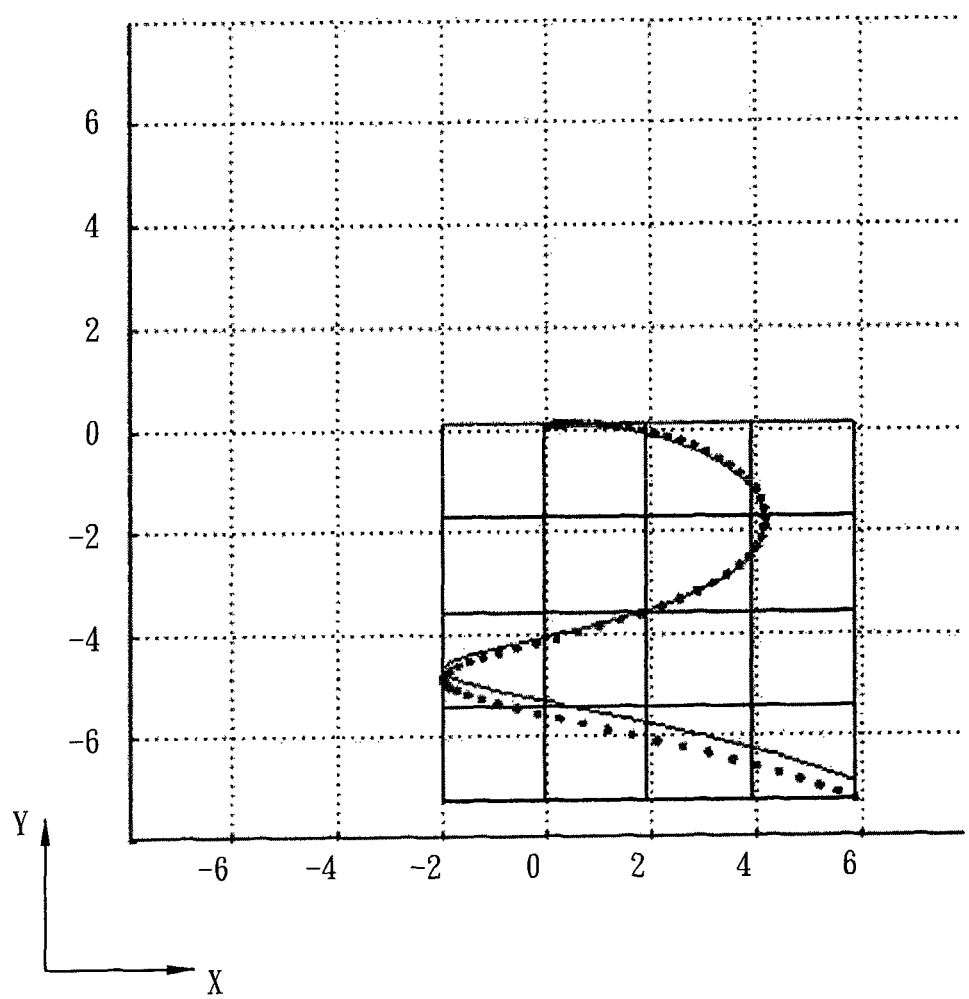

FIGS. 7 and 8 are schematic diagrams showing the moving trajectory obtained by the moving trajectory generation method of the invention.

In FIG. 7, the solid line represents the real moving trajectory, and the dotted line represents the moving trajectory obtained by the moving trajectory generation method of the invention. When writing the number "3" in the air (3-dimensional space), as shown in FIG. 7, the virtual projection plane is the X-Y plane, and the included angle between the trajectory projection plane and the virtual projection plane is 33.9 degrees.

In FIG. 8, the solid line represents the real moving trajectory, and the dotted line represents the moving trajectory obtained by the moving trajectory generation method of the invention. When writing the number "2" in the air (3-dimensional space), as shown in FIG. 8, the virtual projection plane is still the X-Y plane, and the included angle between the trajectory projection plane and the virtual projection plane is 43.3 degrees. According to FIGS. 7 and 8, the real moving trajectories and the moving trajectories obtained by the moving trajectory generation method of the invention are very similar, which means the moving trajectory generation method of the invention can detect the moving trajectory signal of the writing device in the three-dimensional space and then show the correct moving trajectory on a two-dimensional plane.

In summary, the moving trajectory generation method of the invention is to sense a movement of a writing device in the air (3-dimensional space) by a moving trajectory sensing module so as to generate a moving trajectory and then generate a moving trajectory signal, to generate a virtual projection plane and a trajectory projection plane by a trajectory reconstruction unit of a trajectory reconstruction module according to the moving trajectory signal, to calculate an angle between the virtual projection plane and the trajectory projection plane and generate a transformation matrix according to the angle, to transform the virtual projection plane to the trajectory projection plane according to the transformation matrix, and to project the moving trajectory to the trajectory projection plane so as to obtain a two-dimensional trajectory signal. Accordingly, the moving trajectory generation method of the invention can detect the 3-dimensional moving signal of the writing device, which moves in the air (3-dimensional space), and transform it into the correct moving trajectory on a 2-dimensional plane.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A moving trajectory generation method, comprising the steps of:
   sensing a movement of a writing device in the air by a moving trajectory sensing module so as to generate a moving trajectory and then generate a moving trajectory signal, wherein the moving trajectory signal includes a first axial signal, a second axial signal, and a third axial signal, and a first axis, a second axis, and a third axis are perpendicular to each other;
   generating a virtual projection plane and a trajectory projection plane by a trajectory reconstruction unit of a trajectory reconstruction module according to the moving trajectory signal, wherein the weakest signal magnitude of the first axial signal, the second axial signal, and the third axial signal is determined by comparing the first, second and third axial signals, and the axis of the weakest axial signal is used as the normal vector axis to generate the virtual projection plane;
   calculating an angle between the virtual projection plane and the trajectory projection plane, and generating a transformation matrix according to the angle;
   transforming the virtual projection plane to the trajectory projection plane according to the transformation matrix; and
   projecting the moving trajectory signal to the trajectory projection plane so as to obtain a two-dimensional trajectory signal.

2. The moving trajectory generation method of claim 1, wherein the moving trajectory signal comprises an angular velocity signal, an acceleration signal, a magnetic-field intensity signal, a geomagnetic orientation signal, or their combinations in three axes with respect to the moving trajectory at different time points.

3. The moving trajectory generation method of claim 2, further comprising a step of:
   transforming the acceleration signals according to the angular velocity signals by an orientation calculation module so as to transform the acceleration signals from a body frame of the writing device to a local level frame.

4. The moving trajectory generation method of claim 1, wherein in the step of generating the virtual projection plane and the trajectory projection plane when the axis of the weakest axial signal is used as the normal vector axis, the other axes are used as two basis vector axes.

5. The moving trajectory generation method of claim 4, wherein the basis vector axes define the virtual projection plane.

6. The moving trajectory generation method of claim 4, wherein the angle is obtained according to the second axial signal and the third axial signal.

7. The moving trajectory generation method of claim 4, further comprising, before projecting the moving trajectory signal on the trajectory projection plane, a step of:
   calibrating the first axial signal and the second axial signal according to the third axial signal by a detecting-calibration unit of the trajectory reconstruction module, so as to generate a first axial trajectory signal and a second axial trajectory signal.

8. The moving trajectory generation method of claim 7, wherein the step of calibrating the first axial signal comprises:
   when a variation of the third axial signal within a time interval exceeds a preset signal value, the detecting-calibration unit zeros the first axial signal within the time interval.

9. The moving trajectory generation method of claim 7, wherein the step of calibrating the second axial signal comprises:
   when a variation of the third axial signal within a time interval exceeds a preset signal value, the detecting-calibration unit zeros the second axial signal within the time interval.

10. The moving trajectory generation method of claim 1, wherein the moving trajectory represents a trajectory of the writing device projected on the trajectory projection plane as the writing device moves in the air.

11. The moving trajectory generation method of claim 1, further comprising a step of:
   performing a calculation to the two-dimensional trajectory signal by a trajectory calculation unit of the trajectory reconstruction module.

12. The moving trajectory generation method of claim 11, further comprising a step of:
   displaying the two-dimensional moving trajectory by a display module according to the calculated two-dimensional trajectory signal.

* * * * *